US 8,404,963 B2

(12) United States Patent
Kobayashi

(10) Patent No.: US 8,404,963 B2
(45) Date of Patent: Mar. 26, 2013

(54) AUXILIARY MEMBER

(75) Inventor: Shuichi Kobayashi, Aichi-ken (JP)

(73) Assignee: Yanegijutsukenkyujo Co., Ltd., Aichi-Ken (JP)

( * ) Notice: Subject to any disclaimer, the term of this patent is extended or adjusted under 35 U.S.C. 154(b) by 0 days.

(21) Appl. No.: 13/133,375

(22) Filed: Jun. 7, 2011

(65) Prior Publication Data
US 2012/0180406 A1 Jul. 19, 2012

Related U.S. Application Data

(63) Continuation of application No. PCT/JP2009/071527, filed on Dec. 25, 2009.

(51) Int. Cl.
*H01L 31/042* (2006.01)
*F24J 2/46* (2006.01)
*E04D 13/18* (2006.01)

(52) U.S. Cl. ........ 136/244; 136/251; 126/623; 126/704; 248/237; 52/173.3; 52/204.595; 52/202

(58) Field of Classification Search .................. 52/173.3, 52/202, 204.71, 210–213, 204.54, 204.595, 52/204.597, 204.6, 204.67, 200; 136/251, 136/244, 291; 126/704, 623; 248/237
See application file for complete search history.

(56) References Cited

U.S. PATENT DOCUMENTS

| | | | | |
|---|---|---|---|---|
| 3,830,029 A | * | 8/1974 | Vance | 52/395 |
| 4,680,905 A | * | 7/1987 | Rockar | 52/200 |
| 5,706,617 A | * | 1/1998 | Hirai et al. | 52/173.3 |
| 6,088,978 A | * | 7/2000 | Satterwhite | 52/200 |
| 7,956,280 B2 | * | 6/2011 | Kobayashi | 136/251 |
| 2006/0156651 A1 | * | 7/2006 | Genschorek | 52/200 |
| 2008/0302407 A1 | * | 12/2008 | Kobayashi | 136/251 |

FOREIGN PATENT DOCUMENTS

| | | | | |
|---|---|---|---|---|
| GB | 2259937 | A | * | 3/1993 |
| JP | 03093948 | A | * | 4/1991 |
| JP | 05222797 | A | * | 8/1993 |
| JP | 2000-346285 | A | | 12/2000 |
| JP | 2006-037545 | A | | 2/2006 |
| JP | 2007-165499 | A | | 6/2007 |
| JP | 2008-069975 | A | | 3/2008 |
| JP | 2008-127866 | A | | 6/2008 |
| JP | 4365450 | B1 | | 11/2009 |
| WO | WO 9118157 | A1 | * | 11/1991 |

OTHER PUBLICATIONS

International Search Report by Japan Patent Office for PCT/JP2009/071527 dated Feb. 26, 2010.

* cited by examiner

*Primary Examiner* — Jeanette E. Chapman
(74) *Attorney, Agent, or Firm* — Knoble Yoshida & Dunleavy, LLC

(57) ABSTRACT

An auxiliary member which is inserted into between a roof material and a fixing member including a base portion which is placed on the roof material and has a placement portion, a fixing portion, and a concave groove portion, an erected portion which extends to the upper side from the base portion, and a blocking portion which extends from an upper end of the erected portion to both sides so as to be in parallel with the placement portion and blocks the first frame from being moved to the upper side, includes an engagement convex portion which engages with the groove portion of the fixing member, a main body on which the engagement convex portion is formed on an upper surface, and a concave engagement concave portion which is formed on a lower surface of the main body and is engageable with the engagement convex portion.

4 Claims, 9 Drawing Sheets

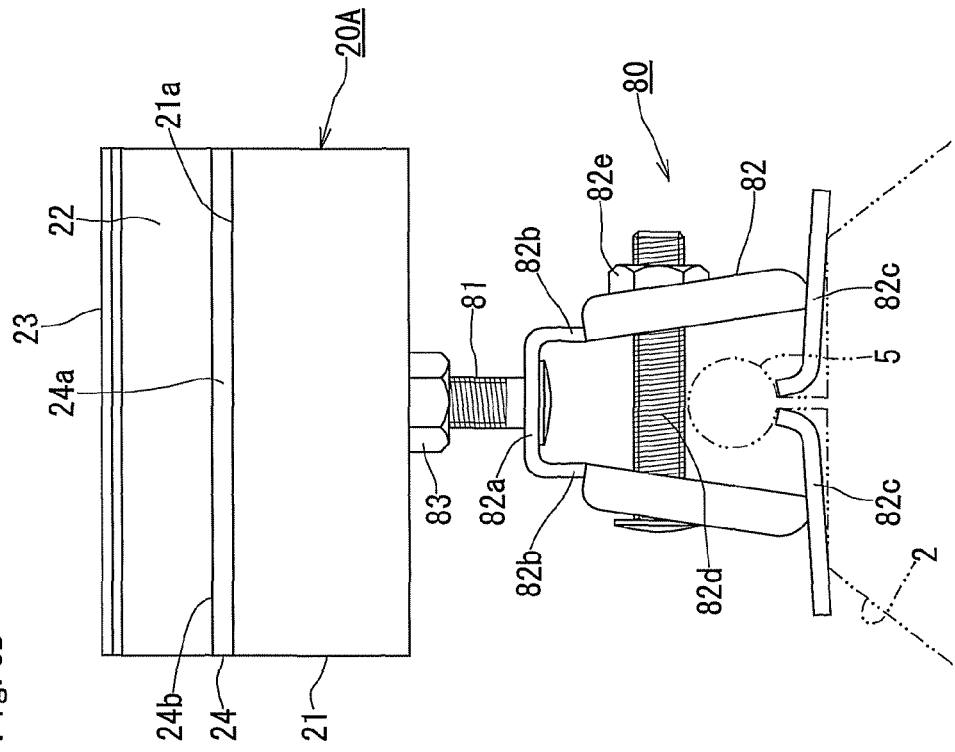
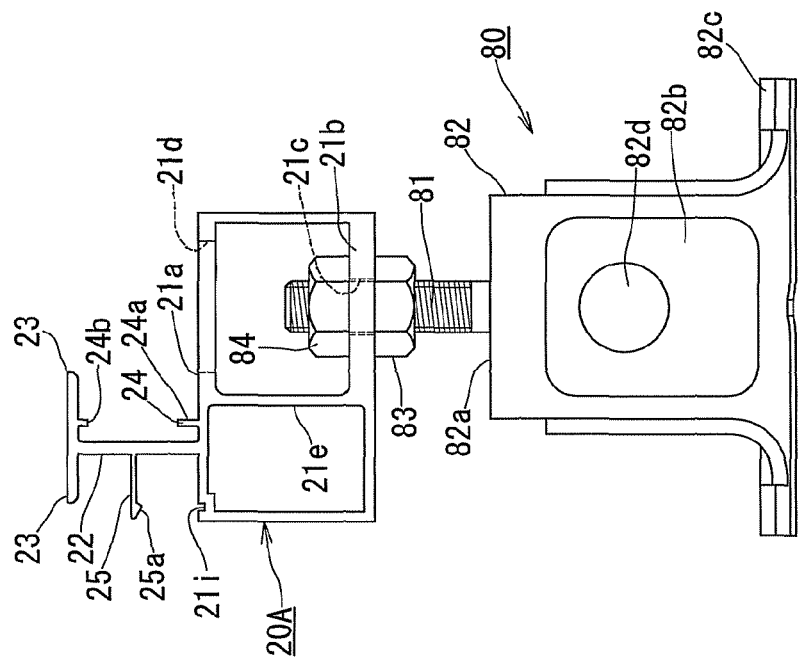

AUXILIARY MEMBER

RELATED APPLICATION DATA

This application is a 35 U.S.C. §371 continuation application of international application No. PCT/JP2009/071527, filed on Dec. 25, 2009, the entire content of which is hereby incorporated by reference.

BACKGROUND OF THE INVENTION

1. Field of the Invention

The present invention relates to an auxiliary member which is inserted into between a fixing member supporting a solar cell module on a roof material and the roof material.

2. Description of the Related Art

Conventionally, a solar cell module installed on a roof of a building or the like has been fixed onto a roof material through a mount formed by assembling long frame members in a form of parallel crosses (Japanese Patent Application Laid-open NO. 2006-037545). However, when the solar cell module is installed (supported) through the mount in the form of parallel crosses, the mount in the form of parallel crosses is needed to be built on the roof for installing the solar cell module. Therefore, time and effort is required and the number of parts is large, resulting in a problem of increase in cost.

In order to solve the above problem, the present inventor has proposed a technique in which the mount in the form of parallel crosses is not installed, each of outer edges of the solar cell module at an eaves side and a ridge side is supported by a plurality of fixing members, and each fixing member is directly fixed onto a roof material (Japanese Patent Application Laid-open NO. 2007-165499). Each fixing member includes a base portion, an erected portion, and a blocking portion. The base portion has a placement portion and a fixing portion and is placed on the roof material. The outer edge of the solar cell module is placed on the placement portion. The fixing portion is formed on a lower side of the placement portion and is a portion for fixing the fixing member onto the roof material. The erected portion extends from the placement portion of the base portion to the upper side. The blocking portion extends from an upper end of the erected portion to both sides so as to be in parallel with the placement portion. In the technique, the outer edge of the solar cell module is sandwiched and supported by the placement portion and the blocking portion.

A plurality of solar cell modules can be fixed onto the roof material sequentially from one side (for example, the eaves side of the roof) by using the fixing members. Therefore, an installing operation of the solar cell modules can be made easy. Further, each fixing member can be slid along the outer edge of the solar cell module. Therefore, the fixing member is fixed onto a structural material of the roof, such as a rafter so that installing strength of the solar cell module can be enhanced. In addition, since the mount is not needed, the number of parts can be reduced, thereby reducing operation cost and cost for installing the solar cell module.

However, when the solar cell module is fixed directly onto the roof material not through the mount, if flatness of the roof material (for example, roof surface material (roof tile, color best, corrugated plate, and the like), rafter, roof board, and the like) onto which the fixing members are fixed is undesirably swelled or strained, the following problem is caused. That is, positions (heights) of the plurality of fixing members which support the solar cell module become non-uniform so that the solar cell module cannot be installed in the right direction or the solar cell module cannot be installed. In addition, when a plurality of solar cell modules are installed on the roof material, there arises a problem that heights at which the solar cell modules are installed become non-uniform so that the entire appearance looks bad.

Conventionally, when a predetermined screw is made to penetrate through the fixing portion of the fixing member and are screwed into the roof material so as to fix the fixing member onto the roof material, there is a risk that rainwater and the like enter the lower side of the roof material down the screwed predetermined screw. Therefore, a plate-like sealing member formed with a rubber and the like is inserted into between the fixing member and the roof material. Further, it can be considered that height at which the fixing member is installed is changed by stacking a plurality of sealing members. However, in this case, the rubber between the fixing member and the roof material becomes thicker. Therefore, if the stacked sealing members become thinner due to temperature change by air temperature and the like, change with age, and the like, the fixing of the fixing member onto the roof material becomes unstable, resulting in deterioration of installation strength of the solar cell module.

SUMMARY OF THE INVENTION

In view of the above circumstances, an object of the invention is to provide an auxiliary member which makes it possible to preferably install a solar cell module by inserting the auxiliary member into between a fixing member and a roof material even when an upper surface of the roof material is strained.

In order to achieve the above object, an auxiliary member according to an aspect of the invention which is inserted into between a roof material and a fixing member including a base portion which is placed on the roof material and has a placement portion on which an outer edge of a solar cell module is placed, a mounting portion which is formed on the lower side with respect to the placement portion and fixes the fixing member onto the roof material, and a concave groove portion which is formed on a lower surface at a position different from the mounting portion, an erected portion which extends to the upper side from the placement portion of the base portion, and a blocking portion which extends from an upper end of the erected portion to both sides so as to be in parallel with the placement portion and blocks the outer edge of the solar cell module from being moved to the upper side, includes an engagement convex portion which engages with the groove portion of the fixing member, a main body on which the engagement convex portion is formed on an upper surface, an engagement concave portion which is formed on a lower surface of the main body and is engageable with the engagement convex portion.

As the "mouting portion" on the fixing member, "a mounting portion having a mounting hole which penetrates through in the vertical direction", "a fixing portion having a V-shaped groove on at least an upper surface", "a mounting portion which is formed into a plate-like shape", and the like are exemplified. Further, as a form of the "concave groove portion" on the fixing member, "a concave groove portion having a T shaped", "a concave groove portion having a dovetail shape", "a concave groove portion having a square shape", "a concave groove portion having a V shape", and the like are exemplified.

Further, as the "engagement convex portion", "an engagement convex portion having a shape which is the same as an internal shape of the groove portion on the fixing member", "an engagement convex portion having a shape which is smaller than and different from an internal shape of the groove portion on the fixing member", "an engagement convex portion having a shape which is inserted into the groove portion on the fixing member from the lower side so as to engage therewith", and the like are exemplified. In addition, as the "engagement concave portion", "an engagement concave portion having a shape which is the same as the engagement convex portion", "an engagement concave portion having a shape which is larger than and different from the engagement convex portion", and the like are exemplified.

Further, as the "main body", "a main body which has a rectangular frame shape and includes a vertical crosspiece extending in the vertical direction therein", "a solid plate-like main body", "a plate-like main body which includes a plurality of protrusions having the same height on an upper surface thereof", and the like are exemplified.

According to the aspect of the invention, the engagement convex portion of the auxiliary member is engaged with the groove portion of the fixing member so that the mounting height of the fixing member can be made higher by height of the main body of the auxiliary member. Furthermore, the engagement convex portion of the different auxiliary member and the engagement concave portion are engaged with each other so that the plurality of auxiliary members can be stacked in the vertical direction and the height of the fixing member on the roof material can be arbitrarily changed depending on the number of stacked auxiliary members. Accordingly, even when the upper surface of the roof material on which the solar cell module is installed is strained, the strain on the roof material is corrected by inserting the appropriate number of auxiliary members into between the fixing member and the roof material. With this, heights of the fixing members which support the solar cell module can be made uniform so as to preferably install the solar cell module on the roof material.

In addition, as described above, the heights of the fixing members can be made uniform by the auxiliary members. Therefore, even when the plurality of solar cell modules are installed on the roof material, heights of the plurality of solar cell modules can be easily made uniform so that appearance on the roof on which the plurality of solar cell modules are installed looks good.

Further, in the auxiliary member, the engagement convex portion and the engagement concave portion or the engagement convex portion and the groove portion of the fixing member can be engaged with each other. Therefore, when the auxiliary member is engaged with the fixing member or the auxiliary members are stacked on one another, the auxiliary members and the fixing member can be positioned with each other by the engagement. Accordingly, the fixing member is prevented from being fixed onto the roof material in a state where the position of the auxiliary member is deviated so that the fixing member can be fixed onto the roof material reliably. Further, the auxiliary member is engaged with the fixing member or another auxiliary member so that the auxiliary member can be held by the fixing member. Therefore, workability when the fixing member is fixed onto the roof material through the auxiliary member can be made excellent.

Moreover, the auxiliary member is formed with a metal or a hard synthetic resin. Therefore, resistance of the auxiliary member to temperature change and change with age can be enhanced so that the solar cell module can be supported on the roof material in a preferable state for a long period of time.

Further, the auxiliary member according to the aspect of the invention, in addition to the above configuration, it is preferable that "the main body be formed into a laterally long rectangular frame shape and include a vertical crosspiece extending in the vertical direction in the main body.

According to the aspect of the invention, the main body of the auxiliary member is formed into a frame shape so as to include the vertical crosspiece therein. This makes it possible to suppress weight thereof from increasing even when the auxiliary member is made higher. Therefore, the auxiliary member is made lighter so that workability when the solar cell module is installed can be enhanced. Moreover, since the main body of the auxiliary member includes the vertical crosspiece therein, load capacity in the vertical direction can be enhanced so that the solar cell module can be preferably installed on the roof material through the auxiliary members and the fixing members.

It is to be noted that only one vertical crosspiece in the main body of the auxiliary member may be provided or a plurality of vertical crosspieces may be provided.

An auxiliary member according to another aspect of the invention which is inserted into between a roof material and a fixing member including a base portion which is placed on the roof material and has a placement portion on which an outer edge of a solar cell module is placed, a mounting portion which is formed on the lower side with respect to the placement portion and fixes the fixing member onto the roof material, and a concave groove portion which is formed on a lower surface at a position different from the mounting portion, an erected portion which extends to the upper side from the placement portion of the base portion, and a blocking portion which extends from an upper end of the erected portion to both sides so as to be in parallel with the placement portion and blocks the outer edge of the solar cell module from being moved to the upper side, includes an engagement convex portion which engages with the groove portion of the fixing member, and a main body on which the engagement convex portion is formed on an upper surface.

Here, as the "engagement convex portion", "an engagement convex portion having a shape which is the same as an internal shape of the groove portion on the fixing member", "an engagement convex portion having a shape which is smaller than and different from an internal shape of the groove portion on the fixing member", "an engagement convex portion having a shape which is inserted into the groove portion on the fixing member from the lower side so as to engage therewith", and the like are exemplified. Further, as the "main body", "a main body which has a rectangular frame shape and includes a vertical crosspiece extending in the vertical direction therein", "a solid plate-like main body", "a plate-like main body which includes a plurality of protrusions having the same height on an upper surface thereof", and the like are exemplified.

According to the aspect of the invention, the engagement convex portion of the auxiliary member is engaged with the groove portion of the fixing member so that the mounting height of the fixing member can be made higher by height of the main body of the auxiliary member. Accordingly, even when the upper surface of the roof material on which the solar cell module is installed is strained, the strain of the roof material is corrected by inserting the auxiliary member into between the fixing member and the roof material. With this, heights of the fixing members which support the solar cell module can be made uniform so as to preferably install the solar cell module on the roof material. In addition, even when a plurality of solar cell modules are installed on the roof, the heights of the solar cell modules can be made uniform so that appearance on the roof looks good.

It is to be noted that the auxiliary member does not include the engagement concave portion on the lower surface of the main body and the main body can be made lower than the above auxiliary member including the engagement concave portion. Therefore, the mounting height of the fixing member can be changed more finely by using the auxiliary member in combination with the above auxiliary member. This makes it possible to install the solar cell module with the fixing member in a more preferable state.

An auxiliary member according to still another aspect of the invention which is inserted into between a roof material and a fixing member including a base portion which is placed on the roof material and has a placement portion on which an outer edge of a solar cell module is placed, a mounting portion which is formed on the lower side with respect to the placement portion and fixes the fixing member onto the roof material, and a concave groove portion which is formed on a lower surface at a position different from the mounting portion, an erected portion which extends to the upper side from the placement portion of the base portion, and a blocking portion which extends from an upper end of the erected portion to both sides so as to be in parallel with the placement portion and blocks the outer edge of the solar cell module from being moved to the upper side, includes a bar-shaped fixing support portion which is fixed to the mounting portion of the fixing member so as to be relatively movable in the vertical direction, and a base member which holds a lower end of the fixing support portion and is fixed onto the roof material.

Here, as the "fixing support portion", "a fixing support portion having an external thread on a bar-shaped outer circumference, which is inserted into a through hole of the fixing member to fix the fixing member with a nut which is screwed with the external thread, under a condition that the mounting portion of the fixing member is formed as the through hole which penetrates through in the vertical direction", "a fixing support portion having an external thread on a bar-shaped outer circumference, which is screwed with an internal thread hole, under a condition that the mounting portion of the fixing member is formed as the internal thread hole which penetrates through in the vertical direction", and the like are exemplified.

Further, as the "base member", "a base member which supports a lower end of the fixing support portion so as to be slidable in the predetermined direction and is formed into a plate-like shape", "a base member which is fixed by sandwiching a protrusion formed on an upper surface of the roof material (for example, a folded-plate roof, a batten seam roof, and the like)", "a plate-like base member", and the like are exemplified.

According to the aspect of the invention, the fixing support portion on the auxiliary member supports the fixing member so as to be relatively movable in the vertical direction. Therefore, the fixing member can be fixed at an arbitrary height. Accordingly, even when the upper surface of the roof material on which the solar cell module is installed is strained, the strain on the roof material is corrected by inserting the auxiliary member into between the fixing member and the roof material. With this, heights of the fixing members which support the solar cell module can be made uniform so as to preferably install the solar cell module on the roof material. In addition, even when a plurality of solar cell modules are installed on the roof, the heights of the solar cell modules can be made uniform so that appearance on the roof looks good.

Meanwhile, a sheet-like sealing member formed with a rubber or the like may be arranged between the above auxiliary member and the roof material. With the sealing member, when the auxiliary member is fixed onto the roof material with a predetermined mounting screw by making the mounting screw penetrate through the auxiliary member, rainwater and the like can be preferably prevented from entering down the mounting screw to the lower side.

As described above, according to the invention, the auxiliary member which makes it possible to preferably install the solar cell module by inserting the auxiliary member into between the fixing member and the rood material even when an upper surface of the roof material is strained can be provided.

BRIEF DESCRIPTION OF THE DRAWINGS

FIG. 8A is a side view illustrating an auxiliary member in a different form from the examples in FIG. 3 through FIG. 7B and the fixing member. FIG. 8B is a rear view of FIG. 8A.

DETAILED DESCRIPTION OF THE PREFERRED EMBODIMENTS

Figure 1:
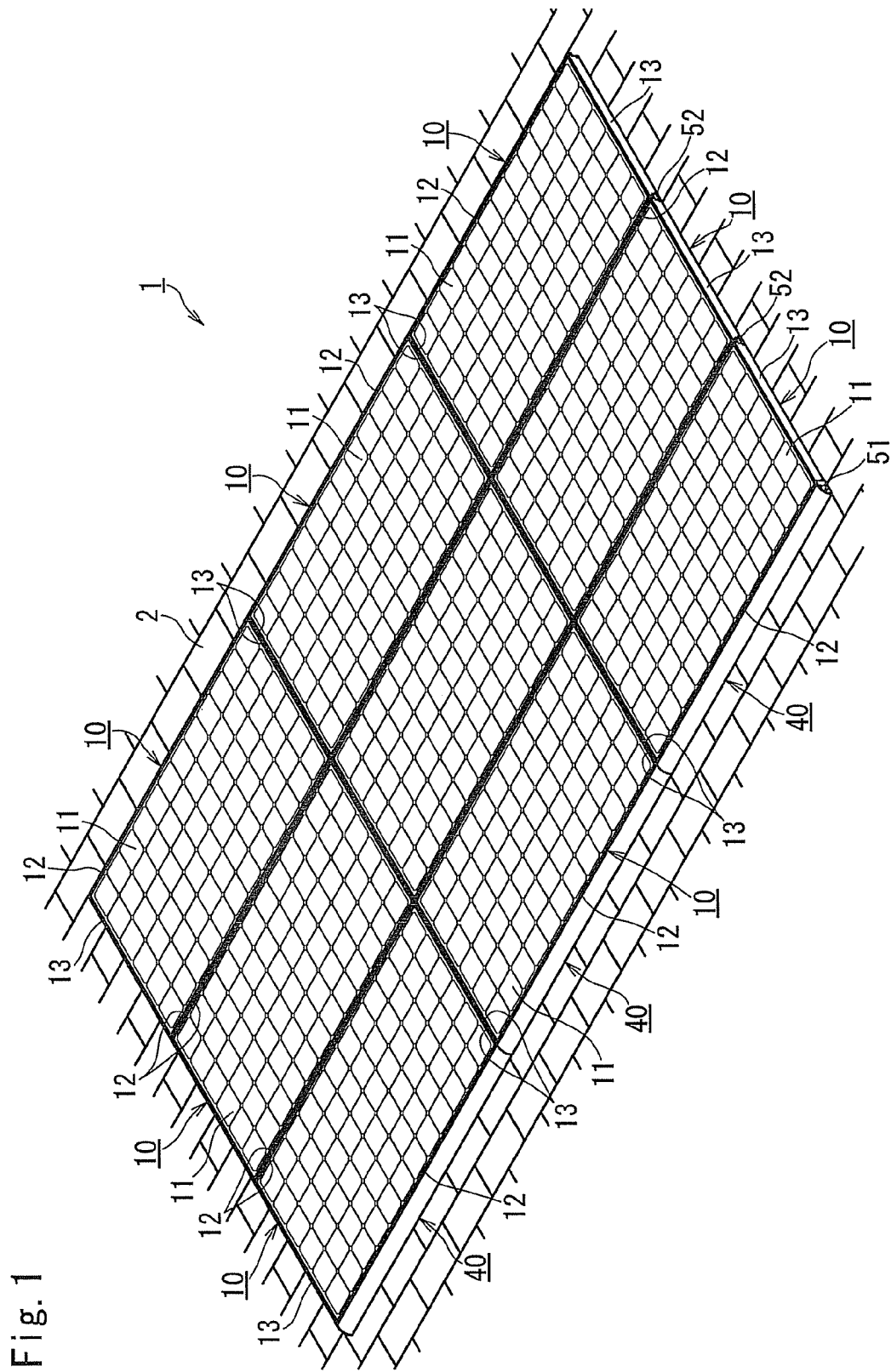
FIG. 1 is an entire perspective view illustrating a solar power generation system to which an auxiliary member according to the invention is applied.
Figure 2:
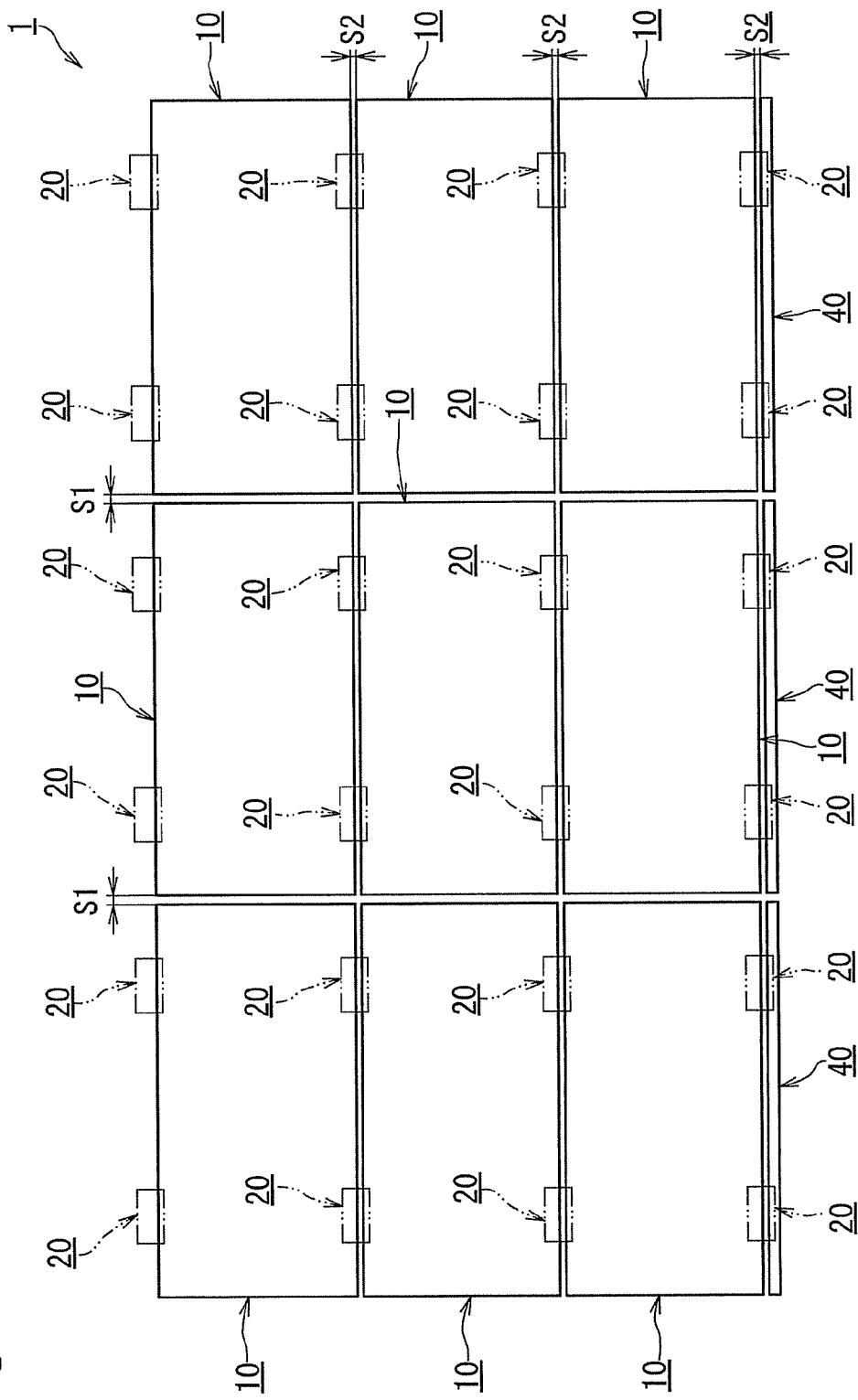
FIG. 2 is a plan view schematically illustrating the solar power generation system of FIG. 1.
Figure 3:
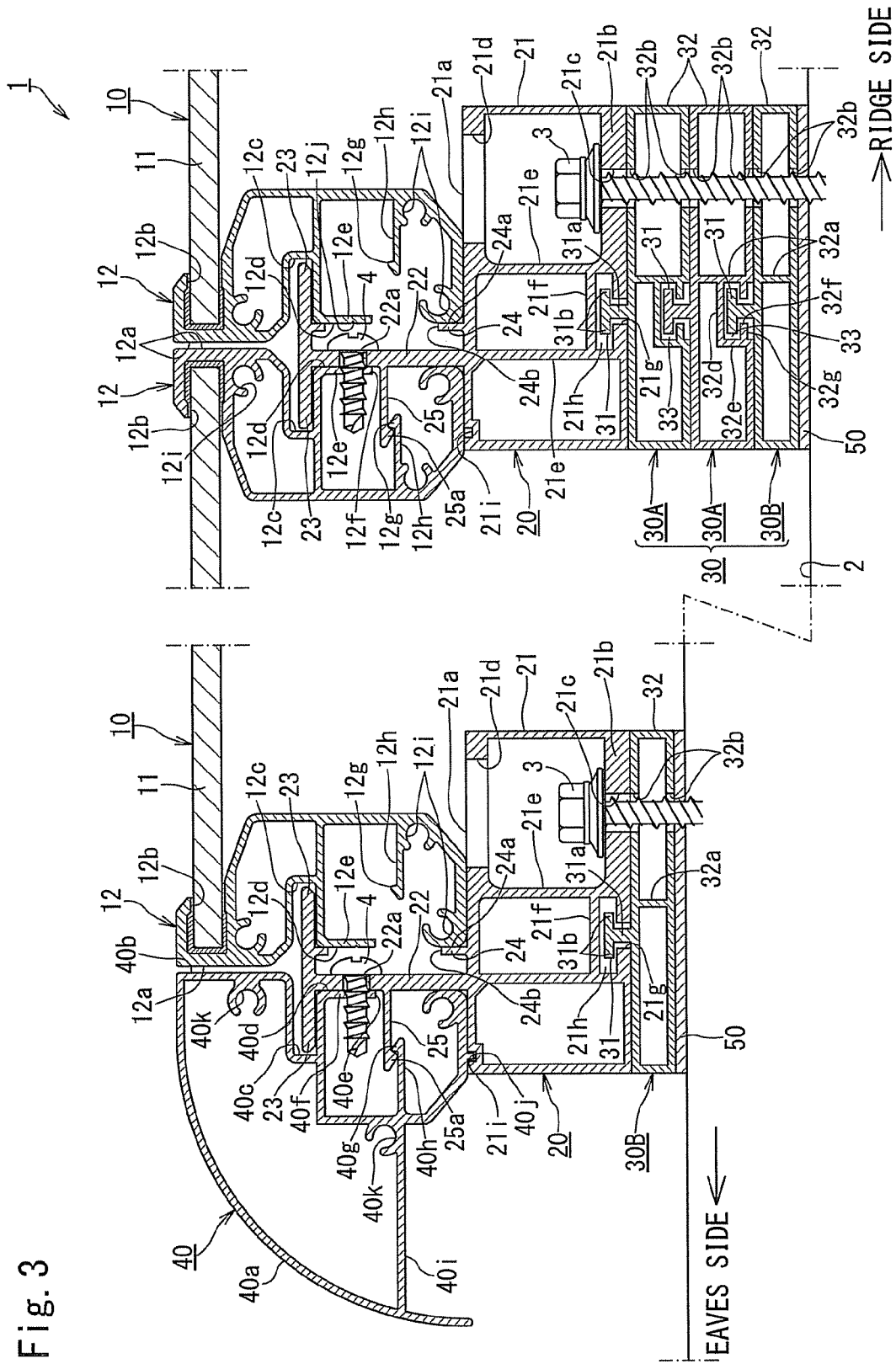
FIG. 3 is a side cross-sectional view illustrating primary parts of the invention in the solar power generation system of FIG. 1.

An auxiliary member which is inserted between a fixing member supporting a solar cell module on a roof material and the roof material according to an embodiment of the invention is described in detail with reference to FIG. 1 through FIG. 5B. FIG. 1 is an entire perspective view illustrating a solar power generation system to which the auxiliary member according to the invention is applied. FIG. 2 is a plan view schematically illustrating the solar power generation system of FIG. 1. FIG. 3 is a side cross-sectional view illustrating primary parts of the invention in the solar power generation system of FIG. 1.

Figure 4:
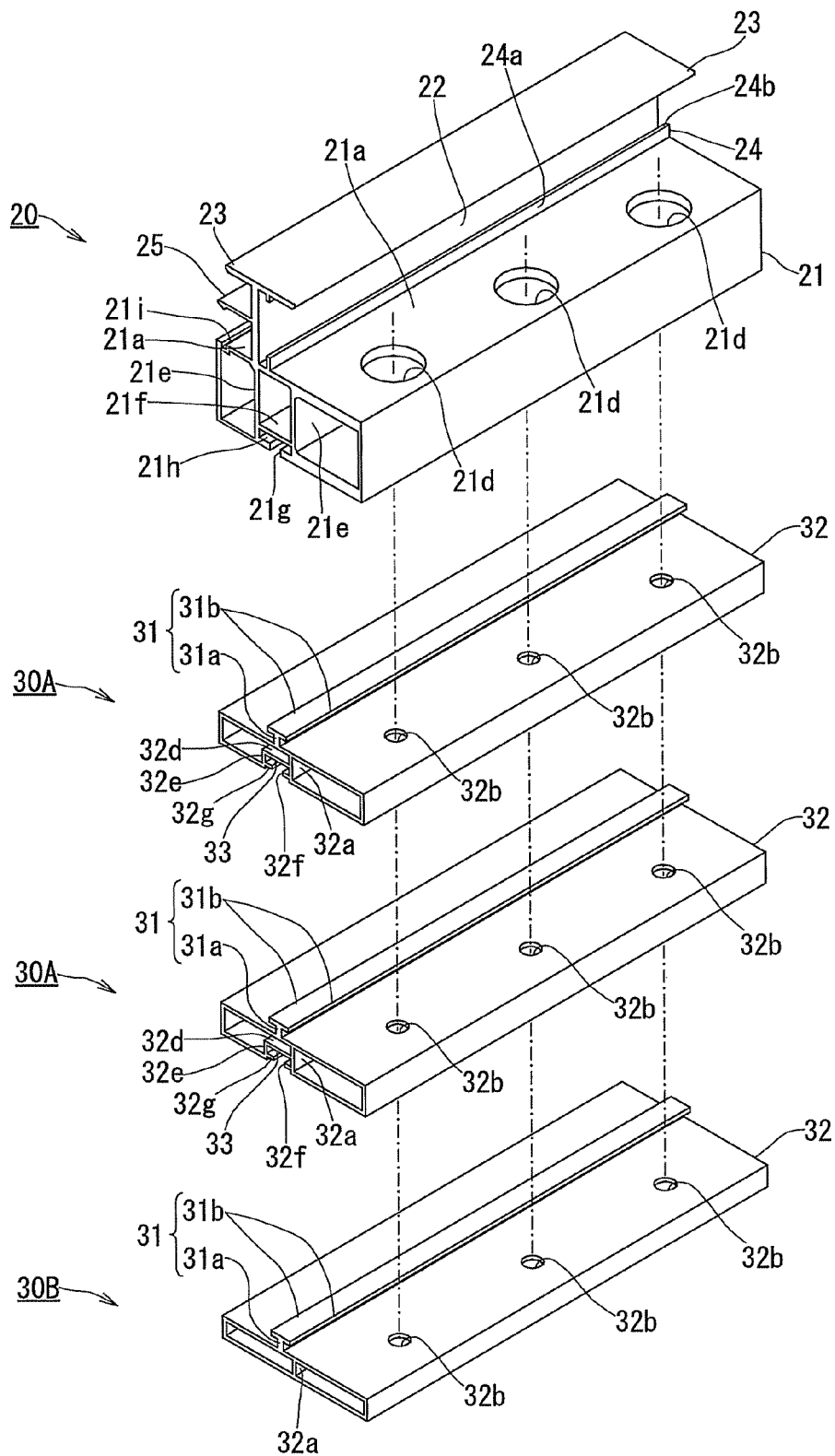
FIG. 4 is an exploded perspective view illustrating an example of an auxiliary member of FIG. 3 and a fixing member.
Figure 5A:
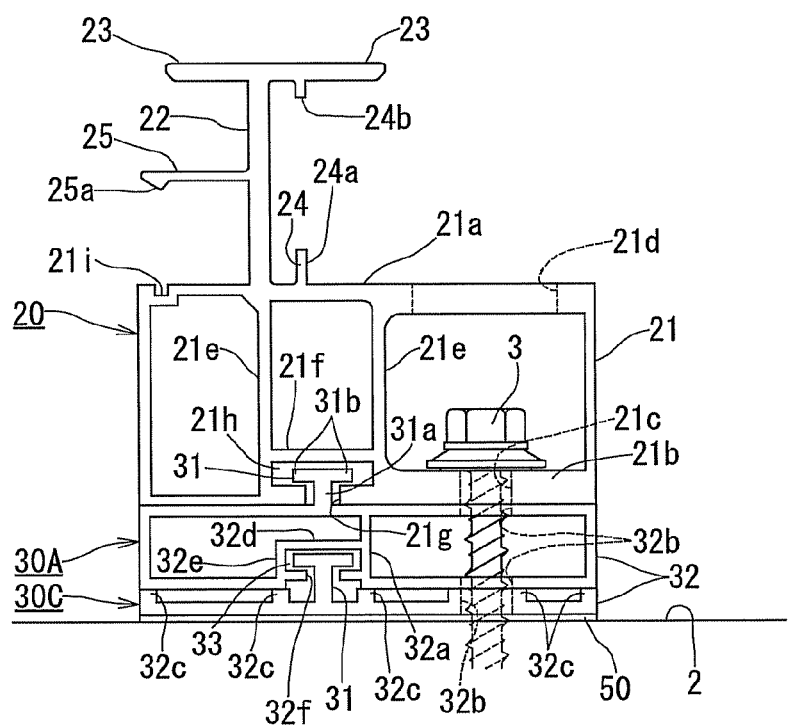
FIG. 5A is a side view illustrating an example of an auxiliary member in a different form from the example in FIG. 3.
Figure 5B:
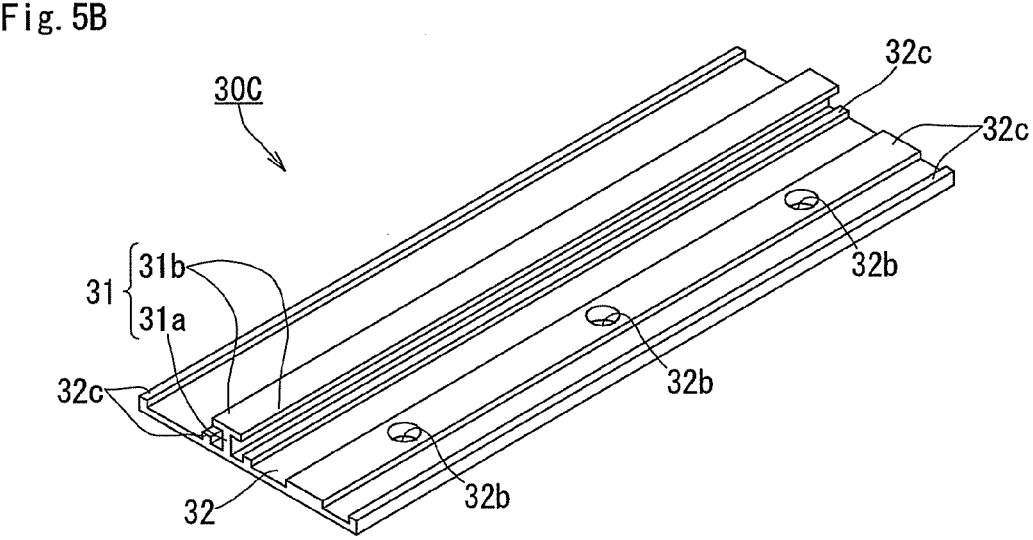
FIG. 5B is a perspective view illustrating the auxiliary member of FIG. 5A.

FIG. 4 is an exploded perspective view illustrating an example of an auxiliary member of FIG. 3 and a fixing member. FIG. 5A is a side view illustrating an example of an auxiliary member in a different form from the example in FIG. 3. FIG. 5B is a perspective view illustrating the auxiliary member of FIG. 5A.

A solar power generation system 1 to which an auxiliary member 30 according to the embodiment is applied mainly includes a plurality of solar cell modules 10, fixing members 20, auxiliary members 30, and dressed covers 40. The fixing members 20 fix the solar cell modules 10 onto a roof material 2. The auxiliary members 30 are inserted into between the fixing members 20 and the roof material 2. The dressed covers 40 are supported by the fixing members 20 and cover eaves-side end faces of the solar cell modules 10 which are arranged at the eaves-most side. Further, the solar power generation system 1 includes plate-like waterproof members 50 arranged between the auxiliary members 30 or the fixing members 20, which are arranged at the lower-most side, and the roof material 2 as illustrated in FIG. 3 and the like. The waterproof members 50 are made of rubber, silicon, or the like. In addition, the solar power generation system 1 mainly includes eaves-side side-face caps 51 and middle-side side-face caps 52 as illustrated in FIG. 1. The eaves-side side-face caps 51 cover joints between the dressed covers 40 and the solar cell modules 10 at the side faces. The middle-side side-face caps 52 cover joints between the solar cell modules 10 at the side faces.

In the embodiment, a case in which the solar power generation system 1 is installed on a slate as the predetermined roof material 2 which supports the solar power generation system 1 is described as an example. However, the solar power generation system 1 may be installed on another roof material such as a roof tile, a corrugated plate, a folded-plate, a batten seam roof, or a zinc roof or may be installed on a long crosspiece member, a mount, a wall face, or the like arranged on a roof board, a roof, or the like.

Each solar cell module 10 of the solar power generation system 1 includes a plate-like solar cell panel 11 having a rectangular outer shape, first frames 12, and second frames 13. The first frames 12 support two side edges (in the embodiment, loner side edges) of the solar cell panel 11, which are opposed to each other. The second frames 13 extend in the direction perpendicular to the first frames 12 and support two side edges (in the embodiment, shorter side edges) of the solar cell panel 11, which are opposed to each other. It is to be noted that although not illustrated in the drawings, each solar cell module 10 further includes a substrate box fixed to a back surface of the solar cell panel 11 and a wire cable which is extended from the substrate box to the outside and through which generated electricity and the like flow.

As illustrated in FIG. 3, each first frame 12 of the solar cell module 10 includes an insertion support portion 12*b*, a connecting portion 12*c*, a box-shaped abutment portion 12*e*, and an engagement section 12*h*. The insertion support portion 12*b* insertion-supports the side edge of the solar cell panel 11 and has an upper side face 12*a* extended in the vertical direction at the side opposite to the side at which the solar cell panel 11 is inserted. The connecting portion 12*c* is arranged at the lower side of the insertion support portion 12*b* and opens to the side opposite to the side at which the solar cell panel 11 is inserted. The abutment portion 12*e* is arranged at the lower side of the connecting portion 12*c* and has a lower side face 12*d* and an opening 12*f*. The lower side face 12*d* is arranged at the inner side with respect to the upper side face 12*a* of the insertion support portion 12*b* in the direction along a surface of the solar cell panel 11 so as to extend in the vertical direction. The opening 12*f* is formed on the lower side face 12*d*. The engagement section 12*h* extends from a side face at the side opposite to the lower side face 12*d* in the abutment portion 12*e* to the opening 12*f* in the lateral direction and has an engagement protrusion 12*g* at a tip thereof. The engagement protrusion 12*g* is formed such that a base end side protrudes upward from the engagement section 12*h* and is formed so as to be made thinner downward toward a tip thereof.

Further, each first frame 12 includes three C-shaped screwed groove portions 12*i* and a V-shaped groove 12*j*. Each of the three screwed groove portions 12*i* is arranged at a predetermined position. The V-shaped groove 12*j* is arranged on the lower side face 12*d* at the upper side of the opening 12*f* of the abutment portion 12*e*. Each first frame 12 is formed to be a continuous long member having the same cross sectional shape at any places and is an extrusion molding member made of a metal such as aluminum. Accordingly, two openings of the connecting portion 12*c* and the opening 12*f* are arranged in upper and lower portions on an outer side face of the first frame 12. Further, the upper side face 12*a* and the lower side face 12*d* are formed at different levels so as to sandwich the connecting portion 12*c*. It is to be noted that an inclined chamfer portion is formed at the boundary between the upper side face 12*a* and the connecting portion 12*c*.

Although not illustrated in detail in the drawings, each second frame 13 in the solar cell module 10 includes an insertion support portion which insertion-supports the side edge of the solar cell panel 11 at an upper portion as in the first frame 12. Each second frame 13 has a side face extended in the vertical direction at the side opposite to the side at which the solar cell panel 11 is inserted, which extends over the entire height of the second frame 13. Each second frame 13 is formed to be a continuous long member having the same cross sectional shape at any places and the same height as that of the first frame 12 and is an extrusion molding member made of a metal such as aluminum alloy. Accordingly, an outer side face of each second frame 13 is formed to be flat with no opening, no projection, and the like.

As illustrated in the drawings, each solar cell module 10 is formed as follows. Longer side edges of the solar cell panel 11 are supported by the first frames 12 and shorter side edges of the solar cell panel 11 are supported by the second frames 13. The outer side faces of the second frames 13 at both ends in the lengthwise direction cover ends of the first frames 12 in the lengthwise direction. The first frames 12 and the second frames 13 are fixed to each other with predetermined screws. It is to be noted that a buffering member having waterproof property is filled into between the side edges of the solar cell panel 11 and the insertion support portions 12*b* of the first frames 12 and between the side edges of the solar cell panel 11 and the insertion support portions of the second frames 13.

Further, each fixing member 20 in the solar power generation system 1 includes a base portion 21, an erected portion 22, a blocking portion 23, an inner protrusion 24, and a to-be-engaged section 25. The base portion 21 has a laterally long box shape. The erected portion 22 extends to the upper side from a predetermined position at one side with respect to a center in the lateral direction on an upper surface of the base portion 21. The blocking portion 23 extends from an upper end of the erected portion 22 to both sides so as to be in parallel with the upper surface of the base portion 21. The inner protrusion 24 is arranged between the blocking portion 23 and the base portion 21 at the side of the center of the base portion 21 with respect to the erected portion 22 in the lateral direction. The inner protrusion 24 is formed to be along an axial line parallel with the erected portion 22. The to-be-engaged section 25 extends so as to be in parallel with the upper surface of the base portion 21 from the erected portion 22 at the center between the blocking portion 23 and the base portion 21 in the vertical direction. The to-be-engaged section 25 is arranged at the side opposite to the inner protrusion 24 with respect to the erected portion 22.

The base portion 21 of the fixing member 20 includes a placement portion 21*a* and a mounting portion 21*b*. The placement portion 21*a* forms an upper surface from which the erected portion 22 extends to the upper side and on which the outer edge of the solar cell module 10 (first frame 12) is placed. The mounting portion 21*b* for mounting the fixing member 20 on the roof material 2 is provided at a position at the side opposite to the erected portion 22 with respect to the center in the lateral direction. Mounting holes 21c which open on a lower surface of the base portion 21 and through which only a threaded portion of a mounting screw 3 can pass are formed on the mounting portion 21b. Further, insertion holes 21d through which the mounting screw 3 and the like can pass are formed on the placement portion 21a at positions on the same axes as the mounting holes 21c.

The insertion holes 21d and the mounting holes 21c of the base portion 21 are arranged at positions which do not overlap with the blocking portion 23 when seen from the above. Therefore, the mounting screws 3 can be preferably inserted into the mounting holes 21c. In addition, each insertion hole 21d has a diameter larger than that of each mounting hole 21c. Therefore, a tip of an electric tool or the like or a socket can be reliably screwed into the mounting holes 21c through the insertion holes 21d. It is to be noted that in the embodiment, three insertion holes 21d are provided in the lengthwise direction of the fixing member 20 (see, FIG. 4).

Further, the base portion 21 includes two vertical crosspieces 21e and a lateral crosspiece 21f. The two vertical crosspieces 21e are provided at positions closer to the erected portion 22 in comparison with the mounting portion 21b so as to extend in the vertical direction in the base portion 21. The lateral crosspiece 21f connects the vertical crosspieces 21e. The two vertical crosspieces 21e in the base portion 21 are formed such that the vertical crosspiece 21e farther from the mounting portion 21b is arranged just under the erected portion 22. The base portion 21 is made to have high rigidity with the vertical crosspieces 21e and the lateral crosspiece 21f. In addition, the base portion 21 includes an opening 21g having a predetermined width. The opening 21g is provided on the bottom of the base portion 21 between the two vertical crosspieces 21e so as to open to the lower side. With the opening 21g, a concave groove portion 21h which opens on a lower surface of the base portion 21 and has a T-shaped space is formed. Further, the base portion 21 includes a rectangular concave portion 21i formed in the vicinity of an end on the placement portion 21a at the side opposite to the mounting portion 21b with respect to the erected portion 22.

The erected portion 22 of the fixing member 20 has the same height as height from a lower surface to the connecting portion 12c of the first frame 12. The erected portion 22 of the fixing member 20 has a locking hole 22a at a position between the blocking portion 23 and the to-be-engaged section 25 so as to penetrate through the erected portion 22 in the lateral direction. Further, the blocking portion 23 can be inserted into the connecting portion 12c of the first frame 12. Lower corners at a tip of the blocking portion 23 are obliquely chamfered so that the blocking portion 23 is easily inserted into the connecting portion 12c. It is to be noted that the blocking portion 23 has a length so as not to extend to the outer sides of the base portion 21 when seen from the above.

The inner protrusion 24 of the fixing member 20 is separated from the erected portion 22 to the side of the mounting portion 21b of the base portion 21 by a predetermined distance. Further, the inner protrusion 24 is arranged between the placement portion 21a and the blocking portion 23 so as to extend in parallel with the erected portion 22. An outer end portion 24a facing to the mounting portion 21b is formed to be along an axial line parallel with the erected portion 22. A dimension between the outer end portion 24a of the inner protrusion 24 and the erected portion 22 is set such that a head portion of a locking screw 4 is sufficiently accommodated in a space therebetween as illustrated in FIG. 3. Further, the inner protrusion 24 has a void 24b penetrating through the inner protrusion 24 in the lateral direction as illustrated in the drawings. A space of the void 24b in the vertical direction is formed to be smaller than a space between the base portion 21 (placement portion 21a) and the blocking portion 23 possibly and the void 24b faces the locking hole 22a of the erected portion 22. In addition, the inner protrusion 24 is separated into upper and lower portions by the void 24b and the upper portion of the inner protrusion 24 is formed to be shorter than the lower portion thereof on the fixing member 20.

The to-be-engaged section 25 of the fixing member 20 is arranged at a position corresponding to the engagement section 12h of the first frame 12. The to-be-engaged section 25 includes a to-be-engaged protrusion 25a at a tip thereof. The to-be-engaged protrusion 25a is formed such that a base end side protrudes downward from the to-be-engaged section 25 and is formed so as to be made thinner upward toward a tip thereof. The to-be-engaged protrusion 25a can engage with the engagement protrusion 12g of the first frame 12.

Each fixing member 20 in the embodiment is formed to be a continuous long member having the same cross sectional shape at any places. Each fixing member 20 is obtained by cutting an extrusion molding member made of a metal such as aluminum alloy into a predetermined length (for example, the length of ⅙ to 1/20 with respect to the length of the first frame 12) and providing the mounting holes 21c, the insertion holes 21d, and the locking hole 22a in a punching manner.

In addition, the auxiliary members 30 in the solar power generation system 1 are inserted into between the fixing members 20 and the roof material 2 so that mounting heights of the fixing members 20 on the roof material 2 can be changed. In the embodiment, as illustrated in FIG. 3 through FIG. 5B, three auxiliary members 30 (30A, 30B, 30C) having different heights are appropriately combined so that the mounting heights of the fixing members 20 can be changed at multiple stages. Each of the auxiliary members 30 (30A, 30B, 30C) in the embodiment includes an engagement convex portion 31 and a main body 32. The engagement convex portion 31 engages with the groove portion 21h of the fixing member 20. The engagement convex portion 31 is formed on an upper surface of the main body 32. In addition, the auxiliary member 30A further includes an engagement concave portion 33 in addition to the above configurations. The engagement concave portion 33 is formed on a lower surface of the main body 32 and can engage with the engagement convex portion 31.

As illustrated in the drawings, the engagement convex portion 31 of each of the auxiliary members 30 (30A, 30B, 30C) includes a projecting section 31a and an extended section 31b. The projecting section 31a projects to the upper side from an upper surface of the main body 32. The extended section 31b extends from an upper end of the projecting section 31a to both sides so as to be in parallel with the upper surface of the main body 32. The engagement convex portion 31 is formed into a T shape smaller than the groove portion 21h having the T-shaped space in the fixing member 20 by the projecting section 31a and the extended section 31b. Further, the engagement convex portion 31 is formed such that a width between right and left sides of the extended section 31b is larger than that of the opening 21g in the fixing member 20. Therefore, in a state where the engagement convex portion 31 is engaged with the groove portion 21h of the fixing member 20, the engagement convex portion 31 does not get through from the groove portion 21h to the lower side.

Further, as illustrated in FIG. 3 and FIG. 4, the main body 32 of each of the auxiliary members 30A, 30B is formed such that an outer shape thereof is laterally long rectangular frame shape. Further, the main body 32 of each of the auxiliary members 30A, 30B includes a vertical crosspiece 32a and mounting holes 32b. The vertical crosspiece 32a extends in the vertical direction in the main body 32 to connect an upper side and a lower side of the main body 32. The mounting holes 32b penetrate through the main body 32 in the vertical direction at positions corresponding to the mounting holes 21c of the fixing member 20 and each of the mounting holes 32b has a diameter same as that of each of the mounting holes 21c. On the other hand, as illustrated in FIGS. 5A and 5B, the main body 32 of the auxiliary member 30C is formed into a laterally long plate shape and includes mounting holes 32b which correspond to the mounting holes 21c of the fixing member 20. The main body 32 of the auxiliary member 30C further includes a plurality of protrusions 32c which protrude to the upper side at both ends of the main body 32, at a position at which the mounting holes 32b are formed, and at a predetermined position between the both ends. The plurality of protrusions 32c have the same height. It is to be noted that in the embodiment, the height of the main body 32 of the auxiliary member 30B is set to be approximately ⅔ with respect to the main body 32 of the auxiliary member 30A and the main body 32 of the auxiliary member 30C is set to be approximately ⅓ with respect to the main body 32 of the auxiliary member 30A.

The main body 32 of the auxiliary member 30A further includes a ceiling section 32d, a connecting section 32e and an opening 32f. The ceiling section 32d extends from one side face (left side face in FIG. 3) of the vertical crosspiece 32a so as to be in parallel with a lower surface of the main body 32. The connecting section 32e connects a tip of the ceiling section 32d and a lower side of the main body 32. The opening 32f penetrates through the lower side just under the center of the ceiling section 32d in the lateral direction in the vertical direction. At this time, the opening 32f is provided between the connecting section 32e and the vertical crosspiece 32a. In addition, the main body 32 of the auxiliary member 30A further includes step portions 32g. The step portions 32g are arranged at positions concaved to the upper side with respect to the lower surface of the main body 32 between the opening 32f and the connecting section 32e and between the opening 32f and the vertical crosspiece 32a.

In the auxiliary member 30A, the vertical crosspiece 32a of the main body 32, the ceiling section 32d, the connecting section 32e, and the opening 32f form the engagement concave portion 33 which is concaved into a T shape and can accommodate the engagement convex portion 31. Further, in the main body 32 of the auxiliary member 30A, the vertical crosspiece 32a, the ceiling section 32d, and the connecting section 32e couples the lower side which has been split by the opening 32. This make it possible to maintain the strength and rigidity of the main body 32.

As illustrated in FIG. 4 and FIGS. 5A and 5B, each of the auxiliary members 30A, 30B, 30C in the embodiment is formed to be a continuous long member having the same cross sectional shape at any places and is an extrusion molding member made of a metal such as aluminum alloy as in the fixing member 20. Further, the auxiliary members 30A, 30B, 30C are formed to have the same size as the fixing member 20 when seen from the above.

Further, as illustrated in FIG. 3, the dressed covers 40 in the solar power generation system 1 are formed to have the same height as the first frames 12 and the second frames 13 and have the same length as the first frames 12. Each dressed cover 40 includes a dressed surface portion 40a, an upper side face 40b, a connecting portion 40c, a box-shaped abutment portion 40f, an engagement section 40h, and a supporting section portion 40i. The dressed surface portion 40a extends continuously from one upper end to the other lower end in a circular arc form. The upper side face 40b droops from one upper end of the dressed surface portion 40a to the lower side. The connecting portion 40c is arranged at a lower side of the upper side face 40b and opens to one side face side. The abutment portion 40f is arranged at the lower side of the connecting portion 40c and has a lower side face 40d and an opening 40e. The lower side face 40d is arranged to be closer to the other side in comparison with the upper side face and extends in the vertical direction. The opening 40e is formed on the lower side face 40d. The engagement section 40h extends from the side face at the other side in the abutment portion 40f to the opening 40e in the lateral direction and has an engagement protrusion 40g at a tip thereof. The supporting section portion 40i extends from the side face of the abutment portion 40f at the other side in the lateral direction and is connected to the dressed surface portion 40a in the vicinity of the lower end thereof (see, FIG. 3). The engagement protrusion 40g is formed such that a base end side protrudes upward from the engagement section 40h and the engagement protrusion 40g is formed so as to be made thinner downward toward a tip thereof.

Further, each dressed cover 40 includes a V-shaped groove formed on the lower side face 40d at an upper side of the opening 40e in the abutment portion 40f and a protrusion 40j protruding to the lower side on the lower surface of the abutment portion 40f. The protrusion 40j can be inserted into the concave portion 21i of the fixing member 20. In addition, each dressed cover 40 includes three C-shaped screwed groove portions 40k at predetermined positions. Each dressed cover 40 is also formed to be a continuous long member having the same cross sectional shape at any places and is an extrusion molding member made of a metal such as aluminum alloy as in the fixing member 20 and the auxiliary member 30.

Next, installation of the solar power generation system 1 on the roof material 2 is described. In the example as illustrated in FIG. 1, the plurality of solar cell modules 10 are arranged in a grid form such that longer sides of the solar cell modules 10 extend in the direction perpendicular to the inclined direction of the roof. Further, in the example, one sides of the solar cell modules 10 and the dressed covers 40 are fixed onto the roof material 2 with two fixing members 20.

Meanwhile, as illustrated in FIG. 2, the solar power generation system 1 is installed on the roof material 2 such that spaces S1 (2 mm to 5 mm, in the embodiment, approximately 3 mm) are formed in the direction perpendicular to the inclined direction of the roof and spaces S2 (0.5 mm to 5 mm, in the embodiment, approximately 1 mm) are formed in the inclined direction of the roof between the solar cell modules 10 and between the dressed covers 40. With the spaces, the solar cell modules 10, the dressed covers 40, and the like do not make into contact with each other even when they expand due to change in air temperature, or the like. Further, loads of the solar cell modules 10 at the upper side are not transmitted to those at the lower side in the inclined direction of the roof.

As illustrated in FIG. 3, the solar power generation system 1 is installed as follows. At first, the dressed cover 40 is placed on the placement portions 21a of the fixing members 20 at the side opposite to the mounting portions 21b with respect to the erected portions 22. At the same time, the blocking portions 23 of the fixing members 20 are inserted into the concave connecting portion 40c of the dressed cover 40. With this, a plurality of (in the embodiment, two) fixing members 20 are fitted into one dressed cover 40. Then, the fixing members 20 and the dressed cover 40 are arranged on the roof material 2 at a predetermined position at the eaves side such that the dressed cover 40 extends in the direction perpendicular to the inclined direction of the roof. After that, the fixing members 20 are mounted on the roof material 2 using predetermined mounting screws 3.

When the fixing members 20 are mounted on the roof material 2, the fixing members 20 are made to slide in the lengthwise direction of the dressed cover 40 so that the mounting screws 3 are screwed into a structural member of the roof such as a rafter, which supports the roof material 2. Then, the plurality of dressed covers 40 are provided in line in the direction perpendicular to the inclined direction of the roof such that spaces S1 having a predetermined size (for example, 2 mm to 5 mm) are formed between the dressed covers 40. It is to be noted that after the fixing members 20 fitted into the dressed cover 40 are mounted on the roof material 2, the locking screws 4 are screwed into the abutment portion 40f of the dressed cover 40 from the ridge side through the locking holes 22a of the erected portions 22. This makes it possible to prevent the dressed cover 40 from sliding with respect to the fixing members 20.

Subsequently, after the plurality of dressed covers 40 are installed on the roof material 2, a plurality of (in the embodiment, two) fixing members 20 are fitted into the first frame 12 of each solar cell module 10 at one side (ridge side). To be more specific, the fixing members 20 are fitted into the first frame 12 such that the abutment portion 12e of the first frame 12 is sandwiched between the blocking portions 23 at the side opposite to the mounting portions 21b with respect to the erected portions 22 of the fixing members 20 and the placement portions 21a of the base portions 21.

Then, in a state where the fixing members 20 are fitted into the first frame 12 of the solar cell module 10 at the ridge side, the first frame 12 at the eaves side is placed as follows. That is, in such a state, the first frame 12 at the eaves side is placed on the placement portions 21a at the eaves side with respect to the erected portions 22 on upper surfaces of the base portions 21 of the fixing members 20 by which the dressed cover 40 is fixed onto the roof material 2. Further, the solar cell module 10 is made to slide to the eaves side and the blocking portions 23 at the side of the mounting portions 21b on the fixing members 20 are inserted into the connecting portion 12c of the first frame 12. At the same time, the lower side face 12d of the abutment portion 12e on the first frame 12 is abutted against the outer end portions 24a of the inner protrusions 24 on the fixing members 20.

Therefore, movement of the first frame 12 at the eaves side on the solar cell module 10 in the downward direction is restricted by the base portions 21 of the fixing members 20 and movement thereof in the upward direction is restricted by the blocking portions 23. Further, movement of the first frame 12 at the eaves side on the solar cell module 10 in the outer-side direction (eaves side direction) along the surface of the solar cell panel 11 is restricted by the inner protrusions 24. Moreover, the abutment portion 12e of the first frame 12 is abutted against the inner protrusions 24 of the fixing members 20 so that spaces are formed between the erected portions 22 and the abutment portion 12e and the head portions of the locking screws 4 are accommodated in the spaces. As illustrated in the drawing, spaces S2 having a predetermined size (in the embodiment, approximately 1 mm) are formed between the dressed covers 40 and the first frames 12. With the spaces, the dressed covers 40 and the first frames 12 do not make into contact with each other even when they expand due to the change in air temperature, or the like. Further, loads of the solar cell modules 10 arranged at the upper side in the inclined direction of the roof are not transmitted to the dressed covers 40, the solar cell modules 10, and the like arranged at the lower side.

Subsequently, the first frame 12 at the ridge side on the solar cell module 10 is lowered to the side of the roof material 2 and the fixing members 20 fitted into the first frame 12 at the ridge side are placed on the roof material 2. At this time, as in the dressed cover 40, the fixing members 20 are made to slide in the lengthwise direction of the first frame 12 such that the mounting screws 3 are screwed into a structural member such as a rafter. Then, the fixing members 20 are mounted on the roof material 2 with the mounting screws 3 and one of the solar cell modules 10 at a first stage is arranged. It is to be noted that after the fixing members 20 are mounted on the roof material 2, the locking screws 4 are screwed into the abutment portion 12e of the first frame 12 from the ridge side through the locking holes 22a of the erected portions 22. This makes it possible to prevent the solar cell module 10 from sliding with respect to the fixing members 20.

Thereafter, as in the same manner as described above, the subsequent solar cell module 10 is arranged so as to be adjacent to the above solar cell module 10 in the direction perpendicular to the inclined direction. As in the dressed covers 40, the solar cell modules 10 at the first stage are sequentially arranged such that spaces S1 having a predetermined size are formed between the solar cell modules 10. After that, the fixing members 20 are mounted on the roof material 2 using the mounting screws 3.

After the solar cell modules 10 at the first stage are installed in such a manner, the solar cell modules 10 at second and third stages are sequentially installed by repeating the above operations. After all of the solar cell modules 10 are finished to be installed, the eaves-side face caps 51 and the middle-side face caps 52 are fixed onto side faces of the dressed covers 40 and the solar cell modules 10 at both outer sides in the direction perpendicular to the inclined direction of the roof with predetermined screws 6. Therefore, the ends of the dressed covers 40 and the first frames 12, which are exposed to side face sides, are covered by the eaves-side face caps 51 and the middle-side face caps 52. Then, the solar power generation system 1 is completely installed.

Here, flatness of the upper surface of the roof material 2 on which the solar power generation system 1 (solar cell module 10) is installed is undesirably swelled or strained in some case. If the solar cell module 10 is installed and fixed onto the roof material 2 by the fixing members 20 in a state where the flatness thereof is undesirable, the following problem is caused. That is, positions (heights) of the plurality of fixing members 20 which support the solar cell module 10 become non-uniform so that the solar cell module cannot be installed in the right direction or the solar cell module cannot be installed. In addition, even when a plurality of solar cell modules 10 are installed on the roof material 2, there arises a problem that heights at which the solar cell modules 10 are installed become non-uniform so that the entire appearance look bad.

In order to solve the problem, in the embodiment, the appropriate number of auxiliary members 30 (30A, 30B, 30C) are inserted into between each fixing member 20 and the roof material 2 so that mounting height of each fixing member 20 is changed, as illustrated in FIG. 3. This makes it possible to make the heights of the fixing members 20 with respect to a surface of the roof uniform. To be more specific, the engagement convex portion 31 of the auxiliary member 30 is engaged with the groove portion 21h formed on the lower surface of the fixing member 20 before each fixing member 20 is mounted on the roof material 2. With this, the auxiliary member 30 is connected to the lower portion of the fixing member 20. In addition, the auxiliary member 30A includes the engagement concave portion 33 on a lower surface of the main body 32. Therefore, the engagement convex portion 31 of another auxiliary member 30 is engaged with the engagement concave portion 33 so that the plurality of auxiliary members 30 can be connected at upper and lower sides.

Connection between the auxiliary members 30 and connection between the auxiliary member 30 and the fixing member 20 are realized as follows. At first, the auxiliary member 30 and the fixing member 20 are arranged such that the engagement convex portion 31 of the auxiliary member 30 matches with the groove portion 21h of the fixing member 20 and the engagement concave portion 33 thereof matches with the engagement convex portion 31 of another auxiliary member 30 from the lengthwise direction of the auxiliary member 30 and the fixing member 20. Then, the auxiliary member 30 and the fixing member 20 and the auxiliary members 30 are made to relatively slide in the lengthwise direction thereof so that the engagement convex portion 31 is engaged with the groove portion 21h and the engagement concave portion 33 thereof is engaged with the engagement convex portion 31 of another auxiliary member 30. With this, connection between the auxiliary members 30 and connection between the auxiliary member 30 and the fixing member 20 are realized.

As illustrated in FIG. 3 and FIG. 5A, the three auxiliary members 30A, 30B, 30C are appropriately combined depending on the mounting heights of the fixing members 20 so that the heights of the fixing members 20 are made uniform. Thereafter, the mounting screws 3 are screwed into the roof material 2 through the mounting holes 21c of the fixing members 20 and the mounting holes 32b of the auxiliary members 30 so as to mount the fixing members 20 and the auxiliary members 30 on the roof material 2.

It is to be noted that in the embodiment, the waterproof member 50 is arranged between the auxiliary member 30 arranged at the lower-most side and the roof material 2. With the waterproof member 50, rainwater and the like can be preferably prevented from entering the roof material 2 and the lower side of the roof material 2 down the mounting screws 3 mounting the fixing member 20. Further, in the embodiment, as the auxiliary member 30 arranged at the lower-most side, the auxiliary members 30B, 30C without the engagement concave portion 33 are employed. However, the invention is not limited thereto and the auxiliary member 30A including the engagement concave portion 33 may be arranged at the lower-most side. Further, although not illustrated in the drawings, the fixing member 20 may be mounted on the roof material 2 without inserting the auxiliary member 30 between the fixing member 20 and the roof material 2 depending on the mounting height of the fixing member 20.

Thus, according to the embodiment, the engagement convex portion 31 of the auxiliary member 30 is engaged with the groove portion 21h of the fixing member 20 so that the mounting height of the fixing member 20 can be made higher by height of the main body 32 of the auxiliary member 30. Furthermore, the engagement convex portion 31 of each of the auxiliary members 30 (30A, 30B, 30C) and the engagement concave portion 33 are engaged with each other so that the plurality of auxiliary members 30 can be stacked in the vertical direction. Therefore, the height of the fixing member 20 on the roof material 2 can be arbitrarily changed depending on the number of stacked auxiliary members 30. Accordingly, even when the upper surface of the roof material 2 on which the solar cell module 10 is installed is strained, the strain on the roof material 2 is corrected by inserting the appropriate number of auxiliary members 30 into between the fixing member 20 and the roof material 2. With this, heights of the fixing members 20 which support the solar cell module 10 can be made uniform so as to preferably install the solar cell module 10 on the roof material 2.

In addition, the heights of the fixing members 20 can be made uniform by the auxiliary members 30 according to the embodiment so that the heights of the plurality of solar cell modules 10 in the solar power generation system 1 can be easily made uniform so that appearance on the roof looks good.

Further, in the auxiliary member 30 according to the embodiment, the engagement convex portion 31 and the engagement concave portion 33 or the engagement convex portion 31 and the groove portion 21h of the fixing member 20 can be engaged with each other. Therefore, when the auxiliary member 30 is engaged with the fixing member 20 or the auxiliary members 30 are stacked on one another, the auxiliary members 30 or the auxiliary member 30 and the fixing member 20 can be positioned with each other by the engagement. The fixing member 20 is prevented from being fixed onto the roof material 2 in a state where the position of the auxiliary member 30 is deviated so that the fixing member 20 can be fixed onto the roof material 2 reliably. Further, in the embodiment, the auxiliary member 30 is engaged with the fixing member 20 or another auxiliary member 30 so that the auxiliary member 30 can be connected to the fixing member 20 to be held. Therefore, workability when the fixing member 20 is fixed onto the roof material 2 using the auxiliary member 30 can be made excellent.

Further, in the embodiment, the main body 32 of each auxiliary member 30 is formed into a frame shape so as to include the vertical crosspiece 32a therein. This makes it possible to suppress weight thereof from increasing even when the auxiliary member 30 is made higher. Therefore, the auxiliary member 30 is made lighter so that workability when the solar cell module 10 is installed can be enhanced. Moreover, since the main body 32 of each auxiliary member 30 includes the vertical crosspiece 32a therein, load capacity in the vertical direction can be enhanced so that the solar cell module 10 can be preferably installed on the roof material 2 through the auxiliary members 30 and the fixing members 20.

Further, in the embodiment, each auxiliary member 30 is formed with an extrusion molding member made of a metal such as aluminum alloy. Therefore, the fixing member 20 can be firmly mounted on the roof material 2 even when the auxiliary member 30 is inserted into between the fixing member 20 and the roof material 2. In addition, resistance to temperature change and change with age can be enhanced so that the solar cell module 10 can be supported on the roof material 2 in a preferable state for a long period of time.

Further, in the embodiment, the mounting height of each fixing member 20 is changed with three auxiliary members 30A, 30B, 30C having different heights. Therefore, the mounting height of the fixing member 20 can be changed more finely. This makes it possible to install the solar cell module 10 with the fixing members 20 in a more preferable state.

Hereinbefore, the invention has been described by using the preferable embodiment. However, the invention is not limited to the embodiment and various improvements and changes in design can be made within a range without departing from a scope of the invention.

Figure 6A:
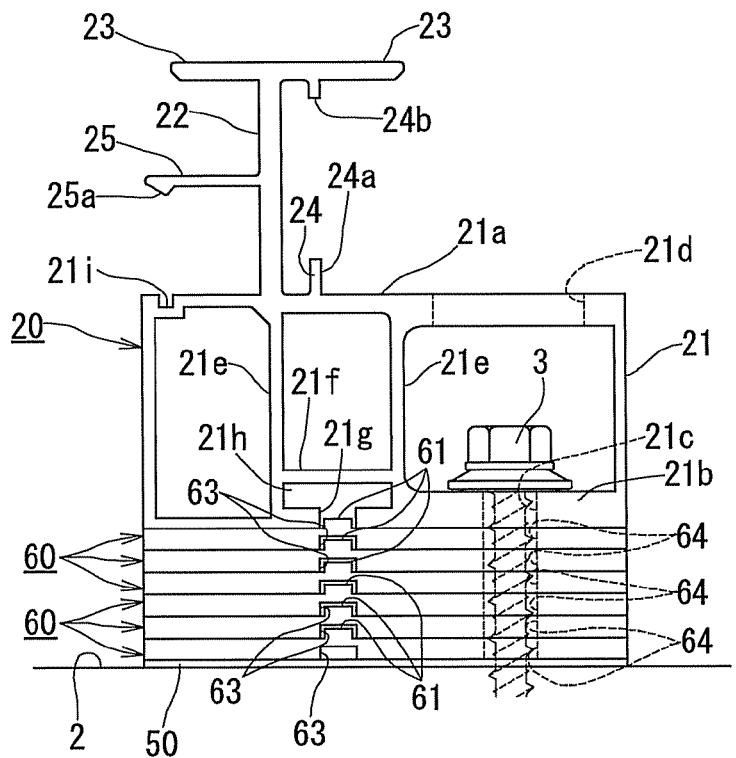
FIG. 6A is a side view illustrating a state where auxiliary members in a different form from the examples in FIG. 3 through FIG. 5B are inserted into between the fixing member and a roof material.
Figure 6B:
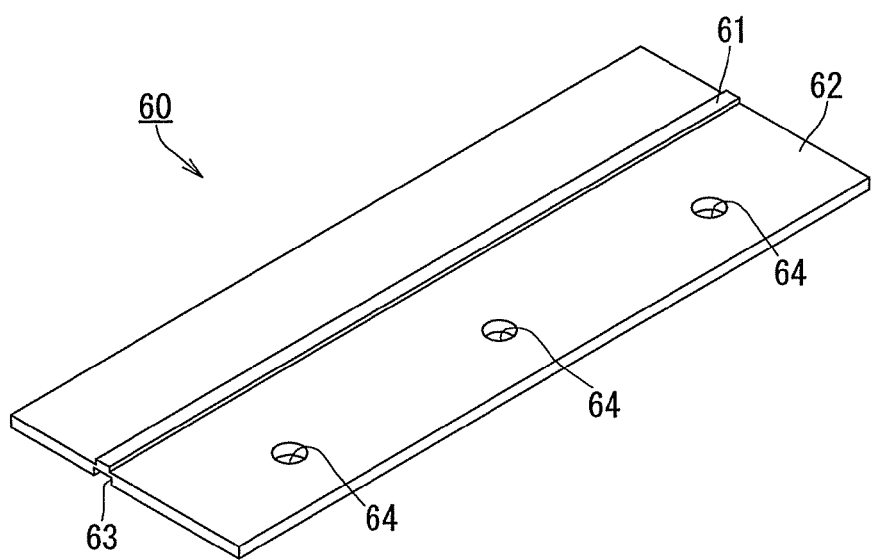
FIG. 6B is a perspective view illustrating the auxiliary member of FIG. 6A.

That is to say, in the above embodiment, the engagement convex portion 31 and the engagement concave portion 33 of each auxiliary member 30 are formed into T shapes. However, the shapes thereof are not limited thereto and each of the engagement convex portion 31 and the engagement concave portion 33 may be formed into a dovetail shape, a square shape, a V shape, and the like. For example, each of the engagement convex portion 31 and the engagement concave portion 33 may be formed into a rectangular square shape as illustrated in FIGS. 6A and 6B. As will be described more in detail, FIG. 6A is aside view illustrating a state where auxiliary members in a different form from the examples in FIG. 3 through FIG. 5B are inserted into between the fixing member and the roof material. FIG. 6B is a perspective view illustrating the auxiliary member of FIG. 6A. It is to be noted that the fixing member 20 in FIG. 6A is the same as the above fixing member 20 and detail description is not repeated.

Each auxiliary member 60 as illustrated in FIGS. 6A and 6B includes an engagement convex portion 61, a plate-like main body 62, and an engagement concave portion 63. The engagement convex portion 61 projects to the upper side in a rectangular square form and can be inserted from the lower side into the groove portion 21h of the fixing member 20 so as to be engaged therewith. The engagement convex portion 61 is formed on an upper surface of the main body 62. The engagement concave portion 63 is formed on a lower surface of the main body 62 at a position just under the engagement convex portion 61 and can engage with the engagement convex portion 61. Further, the auxiliary member 60 further includes mounting holes 64 each of which diameter is the same as that of each mounting hole 21c. The mounting holes 64 penetrate through the auxiliary member 60 in the vertical direction at positions corresponding to the mounting holes 21c on the fixing member 20. The auxiliary member 60 is formed to be a long member having the same cross sectional shape at any places and is an extrusion molding member made of a metal such as aluminum as in the above auxiliary member 30.

With the auxiliary member 60 according to the embodiment, the engagement convex portion 61 of the auxiliary member 60 and the engagement concave portion 63 of another auxiliary member 60 are engaged with each other so that a plurality of auxiliary members 60 can be stacked in the vertical direction. Therefore, the height of the fixing member 20 on the roof material 2 can be arbitrarily changed depending on the number of stacked auxiliary members 60. Accordingly, action effects as those described above can be achieved.

Figure 7A:
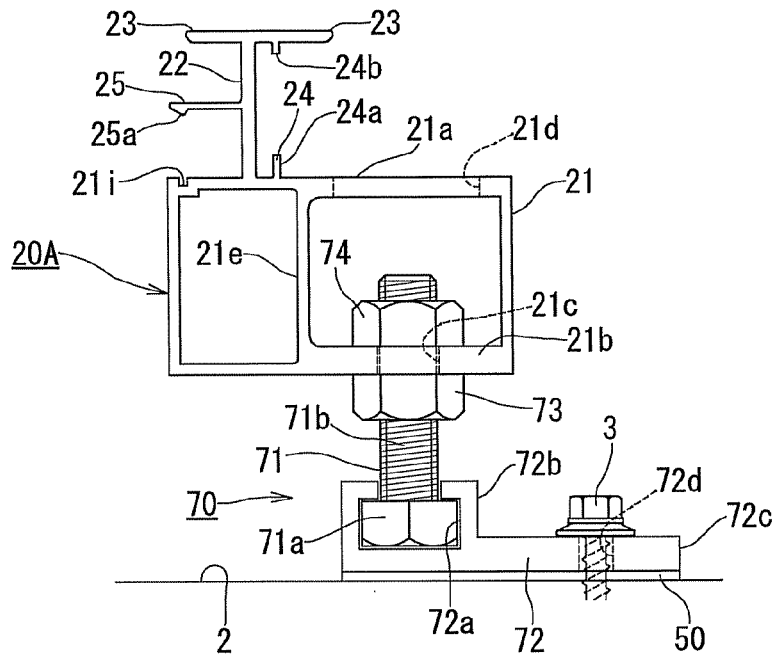
FIG. 7A is a side view illustrating a state where an auxiliary member in a different form from the examples in FIG. 3 through FIG. 6B is inserted into between the fixing member and the roof material.
Figure 7B:
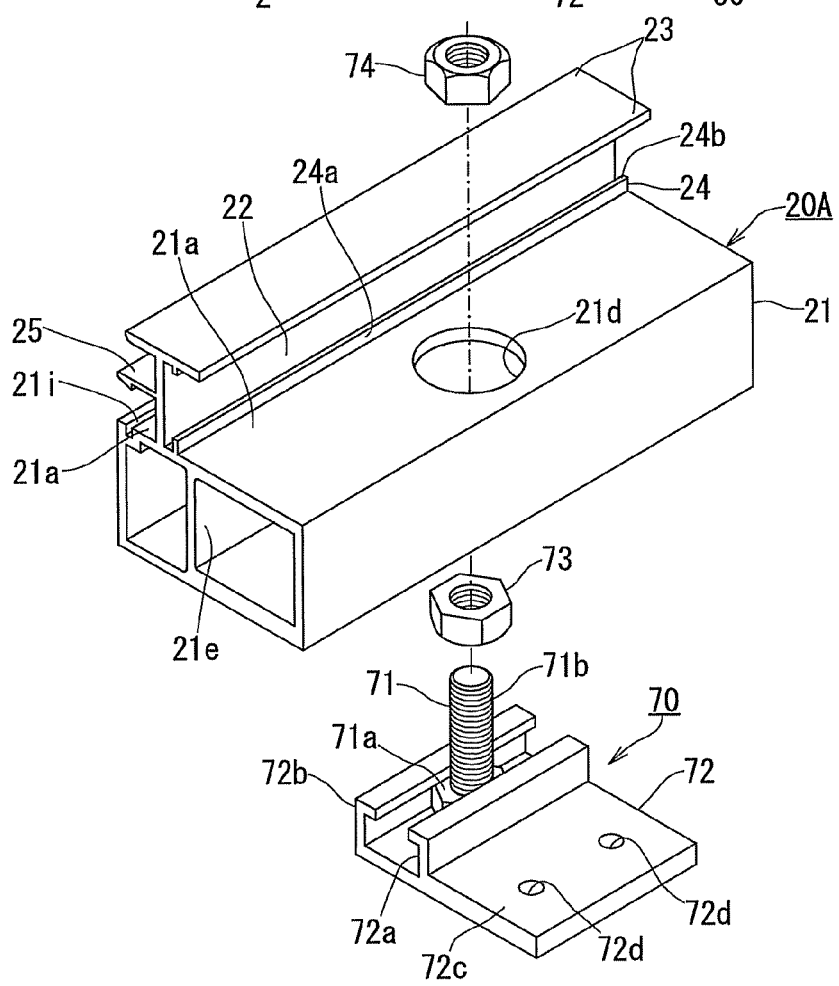
FIG. 7B is an exploded perspective view of FIG. 7A.
Figure 9:
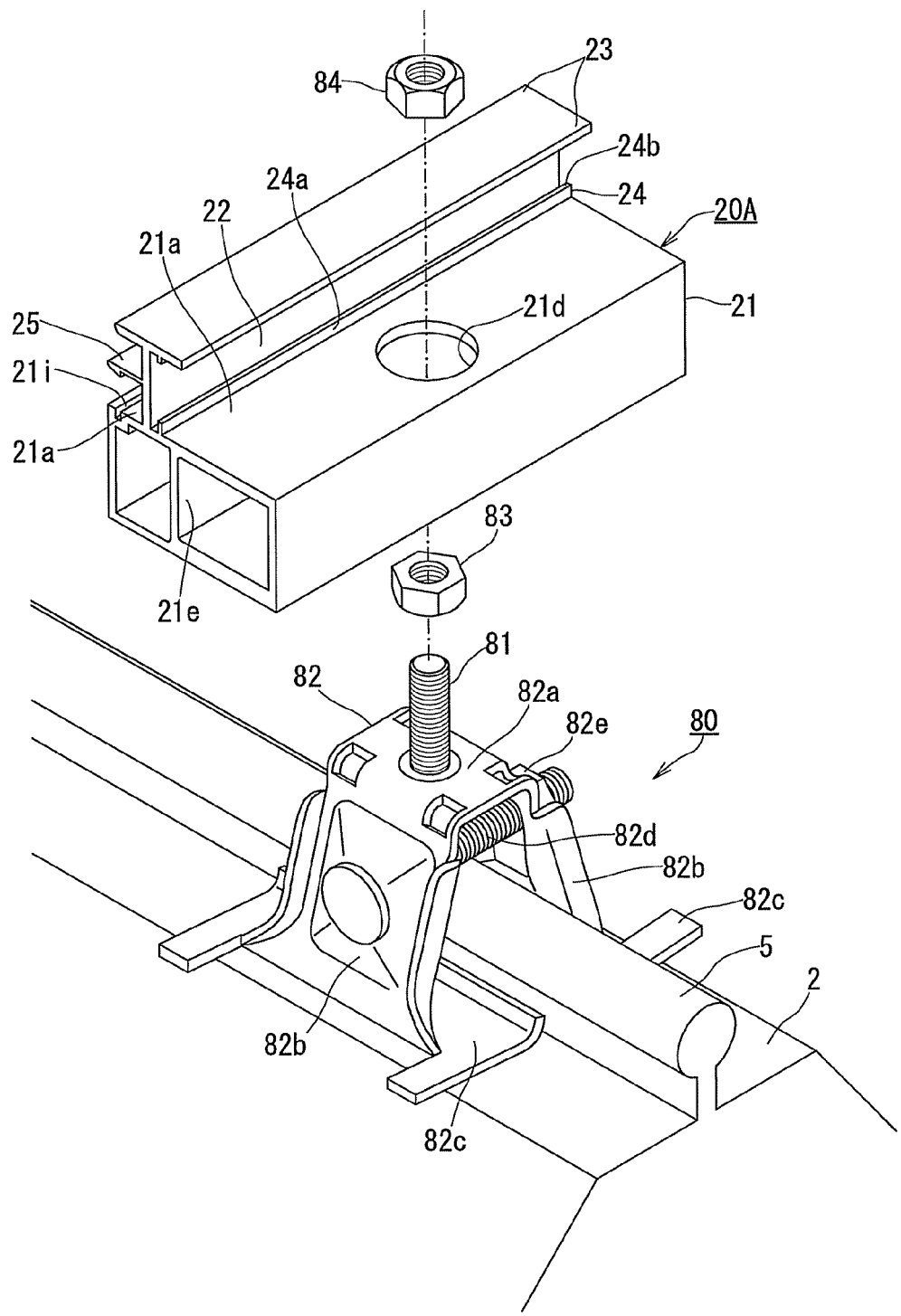
FIG. 9 is an exploded perspective view illustrating a relationship among the auxiliary member of FIGS. 8A and 8B, the fixing member and the roof material.

Further, in the above embodiment, the auxiliary members 30, 60 which make it possible to change the mounting height of the fixing member 20 by stacking the auxiliary members 30, 60 in the vertical direction have been described. However, the invention is not limited thereto. As the auxiliary member, auxiliary members 70, 80 as illustrated in FIG. 7A through FIG. 9 may be employed. As will be described in detail, FIG. 7A is a side view illustrating a state where an auxiliary member in a different form from the examples in FIG. 3 through FIG. 6B is inserted into between the fixing member and the roof material. FIG. 7B is an exploded perspective view of FIG. 7A. FIG. 8A is a side view illustrating an auxiliary member in a further different form and the fixing member. FIG. 8B is a rear view of FIG. 8A. Further, FIG. 9 is an exploded perspective view illustrating a relationship among the auxiliary member of FIGS. 8A and 8B, the fixing member and the roof material.

Each fixing member 20A in FIG. 7A through FIG. 9 is a member obtained by eliminating the vertical crosspiece 21e just under the erected portion 22 on the base portion 21, the lateral crosspiece 21f, the opening 21g, and the groove portion 21h from the above fixing member 20. In the fixing member 20A in FIG. 7A through FIG. 9, the same reference numerals as those in the above fixing member 20 denote the same components and detail description thereof is not repeated. It is to be noted that in the fixing member 20A, the mounting hole 21c and the insertion hole 21d are formed only at the center in the lengthwise direction as illustrated in the drawings. Further, a fixing member 20 including the groove portion 21h may be employed in place of the fixing member 20A.

At first, the auxiliary member 70 as illustrated in FIGS. 7A and 7B includes a bar-shaped fixing support portion 71 and a base member 72. The fixing support portion 71 is fixed to the mounting hole 21c formed on the mounting portion 21b on the base portion 21 of the fixing member 20A so as to be relatively movable in the vertical direction. The base member 72 holds a lower end of the fixing support portion 71 and is fixed onto the roof material 2. The fixing support portion 71 of the auxiliary member 70 includes a polygonal head 71a and an external thread portion 71b which extends to the upper side from the head 71a and on which an external thread is formed on an outer circumference thereof. In the embodiment, the fixing support portion 71 of the auxiliary member 70 is formed as a hexagonal bolt having a predetermined length. Further, the base member 72 of the auxiliary member 70 includes a holding portion 72b and a plate-like fixing portion 72c. The holding portion 72b has a holding groove 72a of which both ends in the lengthwise direction and upper side are opened and which holds the head 71a of the fixing support portion 71 in such a manner that the head 71a can slide in the lengthwise direction. The fixing portion 72c extends to the outer side from one side face in the direction perpendicular to the lengthwise direction in which the holding groove 72a on the holding portion 72b extends. The fixing portion 72c is a portion for fixing the base member 72 onto the roof material 2.

As illustrated in FIGS. 7A and 7B, the auxiliary member 70 is formed as follows. That is, the head 71a of the fixing support portion 71 is inserted into the holding groove 72a of the base member 72 so as to be non-rotatable and slidable. Further, the external thread portion 71b of the fixing support portion 71 extends to the upper side from the opened upper side of the holding groove 72a. It is to be noted that mounting holes 72d which penetrate through in the vertical direction are formed on the fixing portion 72c of the base member 72. Further, the auxiliary member 70 is mounted on the roof material 2 by predetermined mounting screws 3 such that the holding groove 72a of the base member 72 extends in the direction perpendicular to the inclined direction of the roof.

In the auxiliary member 70, an upper end of the external thread portion 71b is inserted into the mounting hole 21c of the fixing member 20A from the lower side in a state where a nut 73 is screwed with the external thread portion 71b of the fixing support portion 71. Then, a nut 74 is screwed with the external thread portion 71b from an upper end of the external thread portion 71b and two nuts 73, 74 sandwich the mounting portion 21b of the fixing member 20A so that the fixing member 20A can be fixed onto the fixing support portion 71. With this configuration, in the auxiliary member 70 according to the embodiment, the nuts 73, 74 which are screwed with the external thread portion 71b are rotated so that the position of the fixing member 20A with respect to the external thread portion 71b (auxiliary member 70) in the vertical direction can be changed. Accordingly, action effects as those of the auxiliary members 30, 60 described above can be achieved.

Further, in the auxiliary member 70, the fixing support portion 71 can slide in the lengthwise direction of the holding groove 72a (in the direction perpendicular to the inclined direction of the roof). Therefore, in a state where the base member 72 is mounted on the structural member of the roof such as a rafter, the fixing member 20A (fixing support portion 71) is slide so as to support the solar cell module 10 at a desired position on the first frame 12 of the solar cell module 10 (for example, at a position at which a load of the solar cell module 10 can be uniformly supported by the plurality of fixing members 20A). Therefore, the solar cell module 10 can be installed in a preferable state.

Meanwhile, in the auxiliary member 70, a configuration in which in a state where a nut is screwed with the external thread portion 71b of the fixing support portion 71 at a lower side with respect to the nut 73 on which the fixing member 20A is placed, the holding portion 72b of the base member 72 is sandwiched between the nut and the head 71a may be employed. The configuration makes it possible to prevent the fixing support portion 71 from sliding along the holding groove 72a. Therefore, the fixing member 20A (solar cell module 10) can be prevented from being deviated and jouncing.

Next, an auxiliary member 80 as illustrated in FIGS. 8A and 8B and FIG. 9 makes it possible to change the mounting height of the fixing member 20A onto the roof material 2 such as a folded-plate roof having a protrusion 5 arranged on an upper surface thereof in a protruding manner by being inserting into between the roof material 2 and the fixing member 20. The auxiliary member 80 includes a bar-shaped fixing support portion 81 and a base member 82. The fixing support portion 81 is fixed to the mounting hole 21c formed on the mounting portion 21b on the base portion 21 of the fixing member 20A so as to be relatively movable in the vertical direction. The base member 82 holds a lower end of the fixing support portion 81 and is fixed onto the roof material 2. An external thread having a predetermined length is formed on an outer circumference of the fixing support portion 81 of the auxiliary member 80.

Moreover, the base member 82 of the auxiliary member 80 includes a ceiling section 82a, plate-like side piece portions 82b, plate-like leg piece portions 82c, a bolt 82d, and a nut 82e. The lower end of the fixing support portion 81 is firmly fixed and held by the ceiling section 82a so as to be non-rotatable. The side piece portions 82b extend from both ends of the ceiling section 82a to the lower side. The leg piece portions 82c extend from the lower ends of the side piece portions 82b so as to be in substantially parallel with the ceiling section 82a (of which ends opposed to each other are slightly higher). The bolt 82d penetrates through the side piece portions 82b at both sides and of which external thread projects to the outside from the one side piece portion 82b. The nut 82e is screwed with the bolt 82d from the outer side of the one side piece portion 82b. In the base member 82, the nut 82e which is screwed with the bolt 82d is rotated in the appropriate direction so that a pair of the leg piece portions 82c can be made closer to each other or separated from each other through a pair of the side piece portions 82b. The protrusion 5 of the roof material 2 is sandwiched between the ends of the leg piece portions 82c, which are opposed to each other, thereby mounting the base member 82 on the roof material 2.

As in the auxiliary member 70, in the auxiliary member 80, an upper end of the fixing support portion 81 is inserted into the mounting hole 21c of the fixing member 20A from the lower side in a state where a nut 83 is screwed with the fixing support portion 81. Then, a nut 84 is screwed with the fixing support portion 81 from an upper end of the fixing support portion 81 and two nuts 83, 84 sandwich the mounting portion 21b of the fixing member 20A so that the fixing member 20A can be fixed onto the fixing support portion 81. With this configuration, in the auxiliary member 80 according to the embodiment, the nuts 83, 84 which are screwed with the fixing support portion 81 are rotated so that the position of the fixing member 20A with respect to the fixing support portion 81 (auxiliary member 80) in the vertical direction can be changed. Accordingly, action effects as those of the auxiliary members 30, 60, 70 described above can be achieved.

In the embodiment, a case where the base member 82 of the auxiliary member 80 is mounted on the protrusion 5 of the folded-plate roof as the roof material 2 has been described. However, the invention is not limited thereto and the base member 82 may be mounted on a batten seam roof, a corrugated plate roof, or the like.

What is claimed is:

1. An auxiliary member which is inserted into between a roof material and a fixing member including a base portion which is placed on the roof material and has a placement portion on which an outer edge of a solar cell module is placed, a mounting portion which is formed on the lower side with respect to the placement portion and fixes the fixing member onto the roof material, and a concave groove portion which is formed on a lower surface at a position different from the mounting portion, an erected portion which extends to the upper side from the placement portion of the base portion, and a blocking portion which extends from an upper end of the erected portion to both sides so as to be in parallel with the placement portion and blocks the outer edge of the solar cell module from being moved to the upper side, comprising:
   an engagement convex portion which engages with the groove portion of the fixing member;
   a main body on which the engagement convex portion is formed on an upper surface; and
   an engagement concave portion which is formed on a lower surface of the main body and is engageable with the engagement convex portion.

2. The auxiliary member according to claim 1, where in the main body is formed into a laterally long rectangular frame shape and includes a vertical crosspiece extending in the vertical direction in the main body.

3. An auxiliary member which is inserted into between a roof material and a fixing member including a base portion which is placed on the roof material and has a placement portion on which an outer edge of a solar cell module is placed, a mounting portion which is formed on the lower side with respect to the placement portion and fixes the fixing member onto the roof material, and a concave groove portion which is formed on a lower surface at a position different from the mounting portion, an erected portion which extends to the upper side from the placement portion of the base portion, and a blocking portion which extends from an upper end of the erected portion to both sides so as to be in parallel with the placement portion and blocks the outer edge of the solar cell module from being moved to the upper side, comprising:
   an engagement convex portion which engages with the groove portion of the fixing member; and
   a main body on which the engagement convex portion is formed on an upper surface.

4. An auxiliary member which is inserted into between a roof material and a fixing member including a base portion which is placed on the roof material and has a placement portion on which an outer edge of a solar cell module is placed, a mounting portion which is formed on the lower side with respect to the placement portion and fixes the fixing member onto the roof material, and a concave groove portion which is formed on a lower surface at a position different from the mounting portion, an erected portion which extends to the upper side from the placement portion of the base portion, and a blocking portion which extends from an upper end of the erected portion to both sides so as to be in parallel with the placement portion and blocks the outer edge of the solar cell module from being moved to the upper side, comprising:
a bar-shaped fixing support portion which is fixed to the mounting portion of the fixing member so as to be relatively movable in the vertical direction; and
a base member which holds a lower end of the fixing support portion and is fixed onto the roof material.

* * * * *